US010812780B2

(12) United States Patent
Zhong et al.

(10) Patent No.: US 10,812,780 B2
(45) Date of Patent: Oct. 20, 2020

(54) IMAGE PROCESSING METHOD AND DEVICE

(71) Applicant: Tencent Technology (Shenzhen) Company Limited, Shenzhen, Guangdong (CN)

(72) Inventors: Javin Zhong, Guangdong (CN); Fay Cheng, Guangdong (CN); Jun Da Bei, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 144 days.

(21) Appl. No.: 15/960,799

(22) Filed: Apr. 24, 2018

(65) Prior Publication Data
US 2018/0241986 A1 Aug. 23, 2018

Related U.S. Application Data

(63) Continuation of application No. PCT/CN2017/075426, filed on Mar. 2, 2017.

(30) Foreign Application Priority Data

Mar. 9, 2016 (CN) .......................... 2016 1 0131682

(51) Int. Cl.
*H04N 13/279* (2018.01)
*G06T 3/00* (2006.01)
(Continued)

(52) U.S. Cl.
CPC ......... *H04N 13/279* (2018.05); *G06F 3/0488* (2013.01); *G06F 3/04815* (2013.01);
(Continued)

(58) Field of Classification Search
CPC ................ H04N 13/279; H04N 13/117; G06F 3/04815; G06F 3/0488
See application file for complete search history.

(56) References Cited

U.S. PATENT DOCUMENTS

| 6,690,393 | B2 * | 2/2004 | Heron | ...................... G06T 19/00 715/757 |
| 2002/0054129 | A1 * | 5/2002 | Heron | ...................... G06T 19/00 715/782 |

(Continued)

FOREIGN PATENT DOCUMENTS

| CN | 1809844 A | 7/2006 |
| CN | 101918983 A | 12/2010 |

(Continued)

OTHER PUBLICATIONS

Office Action corresponding to Chinese Application No. 201610131682. 9, dated Nov. 12, 2018, (7 p).

(Continued)

*Primary Examiner* — Christopher S Kelley
*Assistant Examiner* — Boubacar Abdou Tchoussou
(74) *Attorney, Agent, or Firm* — Brinks Gilson & Lione

(57) ABSTRACT

An image processing method includes presetting an image processing model and performing the following processing based on the model when a first three-dimensional effect plane image is displayed in response to an operation of a user. The method further includes mapping the first three-dimensional effect plane image to the projection plane, determining, according to the three-dimensional position relationship among the viewpoint, the projection plane, and the view window and the size of the view window, a first visual area obtained by projection onto the projection plane (Continued)

through the viewpoint and the view window, and clipping a first image in the first visual area, and displaying the first image.

8 Claims, 18 Drawing Sheets

(51) Int. Cl.
| | | |
|---|---|---|
| G06F 3/0488 | (2013.01) | |
| G06F 3/0484 | (2013.01) | |
| G06F 3/0481 | (2013.01) | |
| G06T 19/00 | (2011.01) | |
| G06F 19/20 | (2011.01) | |
| H04N 13/117 | (2018.01) | |
| H04N 5/232 | (2006.01) | |
| G06T 19/20 | (2011.01) | |

(52) U.S. Cl.
CPC ........ *G06F 3/04845* (2013.01); *G06T 3/0075* (2013.01); *G06T 19/003* (2013.01); *G06T 19/20* (2013.01); *H04N 5/23238* (2013.01); *H04N 13/117* (2018.05); *G06T 2210/04* (2013.01); *G06T 2219/004* (2013.01)

(56) References Cited

U.S. PATENT DOCUMENTS

| | | | |
|---|---|---|---|
| 2004/0201587 A1 | 10/2004 | Mizusawa | |
| 2014/0225894 A1* | 8/2014 | Huang | G06T 15/20 345/427 |
| 2016/0063765 A1* | 3/2016 | Yoshida | G06T 11/00 |
| 2017/0090460 A1* | 3/2017 | Andrew | B29C 64/386 |
| 2017/0091993 A1* | 3/2017 | Andrew | G06F 3/04812 |

FOREIGN PATENT DOCUMENTS

| | | |
|---|---|---|
| CN | 102799318 A | 11/2012 |
| CN | 103019507 A | 4/2013 |
| CN | 103354616 A | 10/2013 |
| CN | 103473692 A | 12/2013 |
| CN | 107180406 A | 9/2017 |

OTHER PUBLICATIONS

International Search Report and Written Opinion dated May 27, 2017 for PCT Application No. PCT/CN2017/075426, 18 pages.

* cited by examiner

Preset an image processing model, the model comprising a viewpoint, a projection plane, a view window, and a three-dimensional position relationship among the viewpoint, the projection plane, and the view window ⟋101

Perform the following processing based on the model when a first three-dimensional effect plane image is displayed in response to an operation of a user: mapping the first three-dimensional effect plane image to the projection plane; determining, according to the three-dimensional position relationship among the viewpoint, the projection plane, and the view window and the size of the view window, a first visual area obtained by projection onto the projection plane through the viewpoint and the view window; and clipping a first image in the first visual area, and displaying the first image ⟋102

FIG. 1A

Determine, in response to a movement operation performed by the user on the touchscreen, a two-dimensional position offset parameter that corresponds to the movement operation and that is on the touchscreen ⟋111

Map the two-dimensional position offset parameter to a three-dimensional position offset parameter of the projection plane, and change three-dimensional positions of the projection plane and the first three-dimensional effect plane image according to the three-dimensional position offset parameter ⟋112

Determine, according to a spatial position relationship among the viewpoint, the projection plane, and the view window and the size of the view window, a second visual area obtained by projection onto the projection plane through the viewpoint and the view window ⟋113

Clip a second image in the second visual area, and display the second image ⟋114

FIG. 1B

IMAGE PROCESSING METHOD AND DEVICE

CROSS-REFERENCE TO RELATED APPLICATION(S)

This application is a continuation of International Patent Application No. PCT/CN2017/075426, filed on Mar. 2, 2017, which claims priority to Chinese Patent Application No. 201610131682.9, entitled "IMAGE PROCESSING METHOD AND DEVICE" filed with the Chinese Patent Office on Mar. 9, 2016, the entirety of all of which are hereby incorporated by reference herein.

FIELD OF THE TECHNOLOGY

The present disclosure relates to the field of computer processing technologies, and in particular, to an image processing method and device.

BACKGROUND OF THE DISCLOSURE

Currently, real scenes or objects can be three-dimensionally displayed by using a three-dimensional panorama image capturing technique. Specifically, the real scenes or objects may be photographed by using a three-dimensional panoramic camera, to obtain six three-dimensional material plane images. Post processing is performed on the six three-dimensional material plane images, so that the six processed three-dimensional material plane images can be seamlessly mapped to a corresponding surface of a three-dimensional model (e.g., stereoscopic model), to generate a three-dimensional panorama image representation. In this way, the real scenes or objects can be three-dimensionally displayed by using the three-dimensional panorama. For a virtual scene, a plurality of plane images can be processed, spliced, and fused, where the fused images are mapped to each surface of a stereoscopic model, to implement a three-dimensional display.

SUMMARY

Embodiments disclosed herein provide a image processing method and a device, so as to efficiently present a three-dimensional display of a virtual scene.

The embodiments disclosed herein provide an image processing method, applied to an electronic device including a touchscreen. The method includes presetting an image processing model, the model including a viewpoint, a projection plane, a view window, and a three-dimensional position relationship among the viewpoint, the projection plane, and the view window; and performing the following processing based on the model when a first three-dimensional effect plane image is displayed in response to an operation of a user: mapping the first three-dimensional effect plane image to the projection plane; determining, according to the three-dimensional position relationship among the viewpoint, the projection plane, and the view window and the size of the view window, a first visual area obtained by projection onto the projection plane through the viewpoint and the view window; and clipping a first image in the first visual area, and displaying the first image.

The present disclosure also provides an image processing device, including a touchscreen. The device further includes: a setting module, configured to preset an image processing model, the model including a viewpoint, a projection plane, a view window, and a three-dimensional position relationship among the viewpoint, the projection plane, and the view window; and a processing module, configured to perform the following processing based on the model when a first three-dimensional effect plane image is displayed in response to an operation of a user: mapping the first three-dimensional effect plane image to the projection plane; determining, according to the three-dimensional position relationship among the viewpoint, the projection plane, and the view window and the size of the view window, a first visual area obtained by projection onto the projection plane through the viewpoint and the view window; and clipping a first image in the first visual area, and displaying the first image.

According to the technical solutions, a three-dimensional display function is provided for a virtual scene. In addition, because professionals do not need to use a three-dimensional panoramic camera to photograph a real scene and process the photographed three-dimensional material images, manufacturing costs for three-dimensionally displaying a real scene are saved.

BRIEF DESCRIPTION OF THE DRAWINGS

To describe the technical solutions in the disclosed embodiments or in the existing technology more clearly, the following briefly describes the accompanying drawings required for describing the embodiments or the existing technology. Apparently, the accompanying drawings in the following description show merely some embodiments, and a person of ordinary skill in the art may still derive other drawings from these accompanying drawings without creative efforts.

FIG. 1A shows a flowchart of an image processing method according to an embodiment;

FIG. 1B shows a flowchart of an image processing method according to another embodiment;

DETAILED DESCRIPTION

Figure 1C:
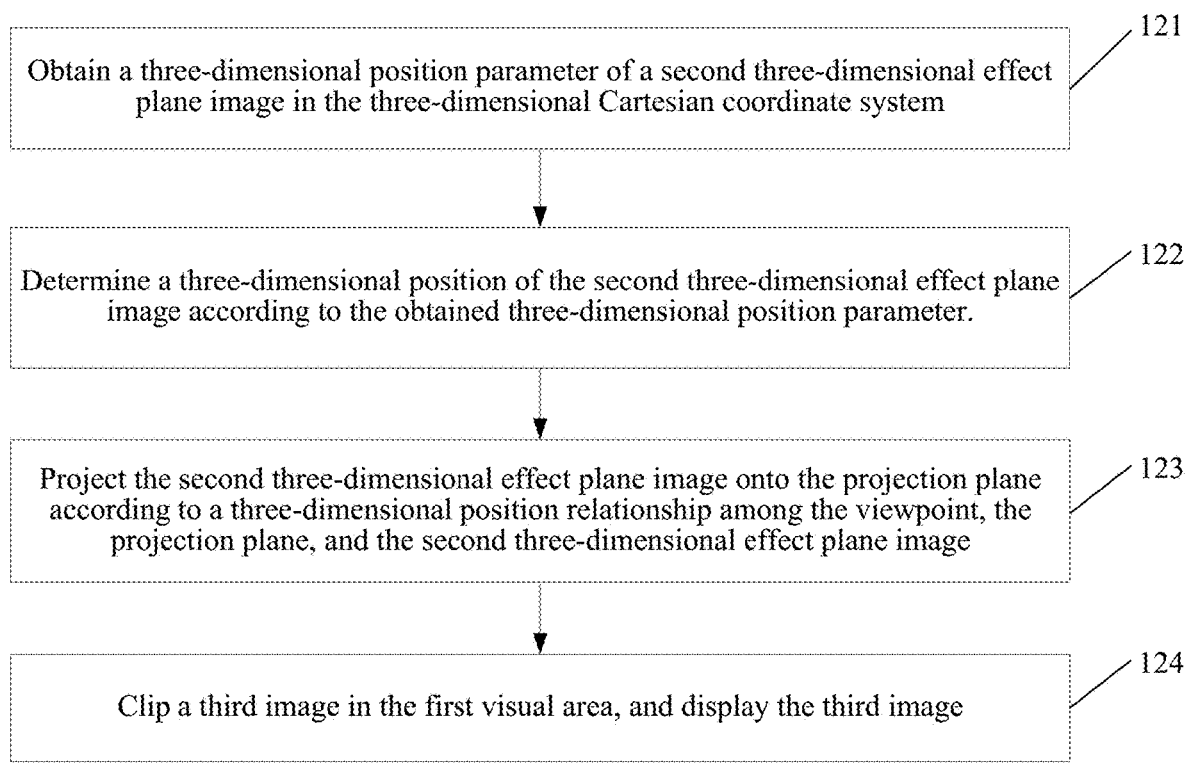
FIG. 1C shows a flowchart of an image processing method according to another embodiment.

This disclosure describes the technical solutions according to certain embodiments, including with reference to the accompanying drawings. The described embodiments may only include some embodiments instead of all embodiments. Other embodiments may be obtained by a person of ordinary skill in the art, and still shall fall within the protected scope of the present disclosure.

A three-dimensional panoramic camera may be used to photograph a real scene that includes object, however may not be capable of image capturing a virtual scene (for example, a virtual gaming scene or a virtual reality scene), and therefore cannot three-dimensionally reproduce or display the virtual scene. For a virtual scenario, a plurality of plane images needs to be processed, spliced, and fused, and the fused image is mapped to each surface of a stereoscopic graphic, to implement three-dimensional display. A large number of processing resources of a computer need to be occupied in a process of performing image processing, slicing, and fusion on a plurality of images. In addition, for the real scene that is photographed by using the three-dimensional panoramic camera, if a small change (for example, adding an object) occurs in the scene, the scene needs to be photographed again. For the virtual scene, if a small change occurs in the scene, each of the plurality of plane images needs to be modified.

In view of this, the embodiments disclosed herein provide an image processing method, applied to an electronic device including a touchscreen. According to the method provided in this embodiment, an image processing model is preset, the model including a viewpoint, a projection plane, a view window, and a three-dimensional position relationship among the viewpoint, the projection plane, and the view window; and the following processing is performed based on the model when a first three-dimensional effect plane image is displayed in response to an operation of a user: mapping the first three-dimensional effect plane image to the projection plane; determining, according to the three-dimensional position relationship among the viewpoint, the projection plane, and the view window and the size of the view window, a first visual area obtained by projection onto the projection plane through the viewpoint and the view window; and clipping a first image in the first visual area, and displaying the first image. According to the method provided in the present disclosure, three-dimensional display is implemented by processing a plane image having a three-dimensional effect, and a plurality of plane images do not need to be processed, spliced, and fused, reducing the processing complexity of a computer, saving processing resources of the computer, and efficiently three-dimensionally displaying a virtual scene. In addition, because professionals do not need to use a three-dimensional panoramic camera to photograph a real scene and process the photographed three-dimensional material images, manufacturing costs for three-dimensionally displaying a real scene are saved.

FIG. 1A shows a flowchart of an image processing method according to an embodiment. The method is applied to an electronic device including a touchscreen. As shown in FIG. 1A, the method includes the following steps:

Step 101: Preset an image processing model, the model including a viewpoint, a projection plane, a view window, and a three-dimensional position relationship among the viewpoint, the projection plane, and the view window.

Figure 2A:
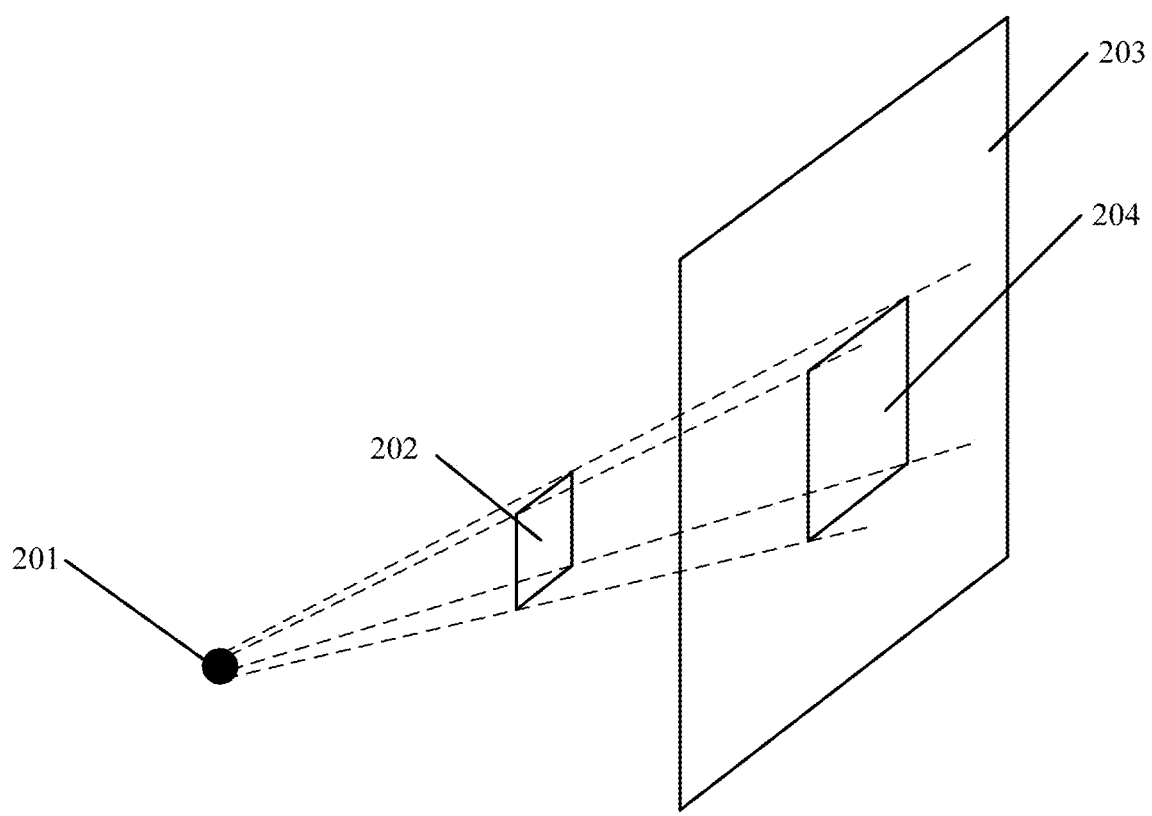
FIG. 2A shows a schematic diagram of an image processing model according to an embodiment.

In an embodiment, in the image processing model, a viewpoint is a position at which a camera is located. Herein, the camera is equivalent to eyes of an observer. As shown in FIG. 2A, a camera located at a viewpoint 201 can see, through a view window 202, an image in a visual area 204 on a projection plane 203.

Figure 2B:
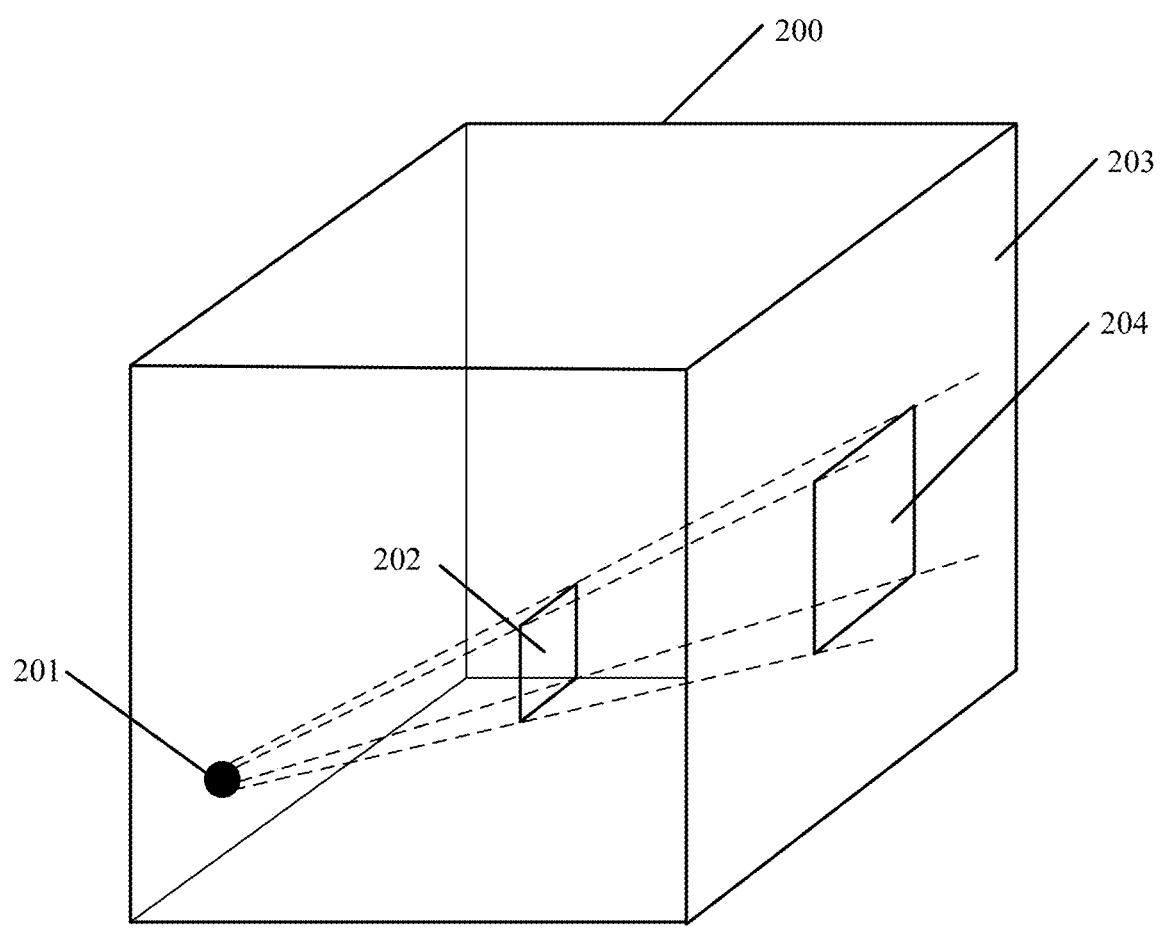
FIG. 2B shows another schematic diagram of the image processing model illustrated in FIG. 2A.

In an embodiment, the projection plane may be a surface of a stereoscopic graphic. The stereoscopic graphic may be a cube, a cylinder, an ellipsoid, or the like. This is not limited in the present disclosure. As shown in FIG. 2B, the projection plane 203 is a surface of a cube 200, and both the viewpoint 201 and the view window 202 are located inside the cube. It should be noted that the viewpoint may be located inside the stereoscopic graphic, or may be located outside the stereoscopic graphic. This is not limited in the present disclosure.

Step 102: Perform the following processing based on the model when a first three-dimensional effect plane image is displayed in response to an operation of a user: mapping the first three-dimensional effect plane image to the projection plane; determining, according to the three-dimensional position relationship among the viewpoint, the projection plane, and the view window and the size of the view window, a first visual area obtained by projection onto the projection plane through the viewpoint and the view window; and clipping a first image in the first visual area, and displaying the first image.

Figure 7A:
FIG. 7A shows a first image depicting a three-dimensional display scene according to an embodiment.
Figure 7B:
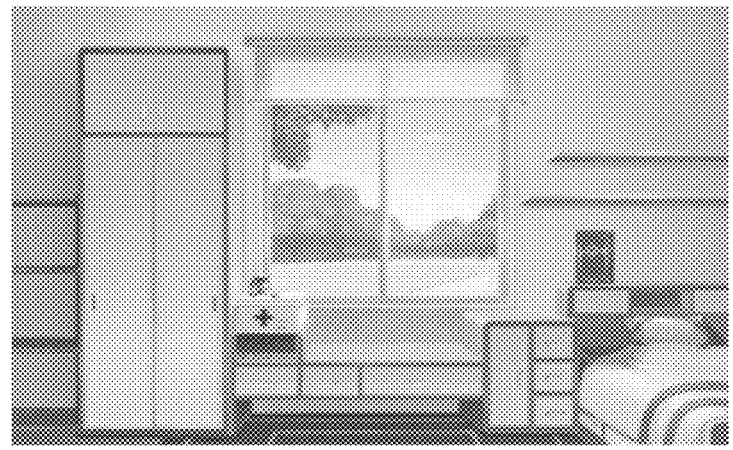
FIG. 7B shows a second image depicting the three-dimensional display scene illustrated in FIG. 7A.

In a specific application, a first three-dimensional effect plane image exemplified in the application is shown in FIG. 7A. When the user opens the application on the electronic device, displaying the first three-dimensional effect plane image is triggered. According to the foregoing method, a first image shown in FIG. 7B is clipped and displayed.

Figure 3A:
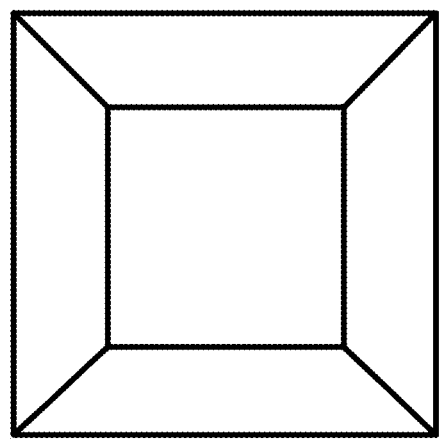
FIG. 3A shows a schematic plane image of a three-dimensional effect according to an embodiment.

In an embodiment, a three-dimensional effect plane image may be an image that is provided by a designer and that has a plane scene effect such as a perspective effect or a shadow effect. As shown in FIG. 3A, in the three-dimensional effect image, five surface images may be included to represent a three-dimensional scene. For example, as shown in FIG. 7A, in a three-dimensional effect plane image, five surface images of a scene can be used to display a three-dimensional living room scene.

In an embodiment, when the first three-dimensional effect plane image is mapped to the projection plane, a corresponding position of the first three-dimensional effect plane image on the projection plane can be determined, and a value corresponding to each pixel point on the projection plane is the same as a pixel value of a corresponding pixel point on the first three-dimensional effect plane image.

Figure 3B:
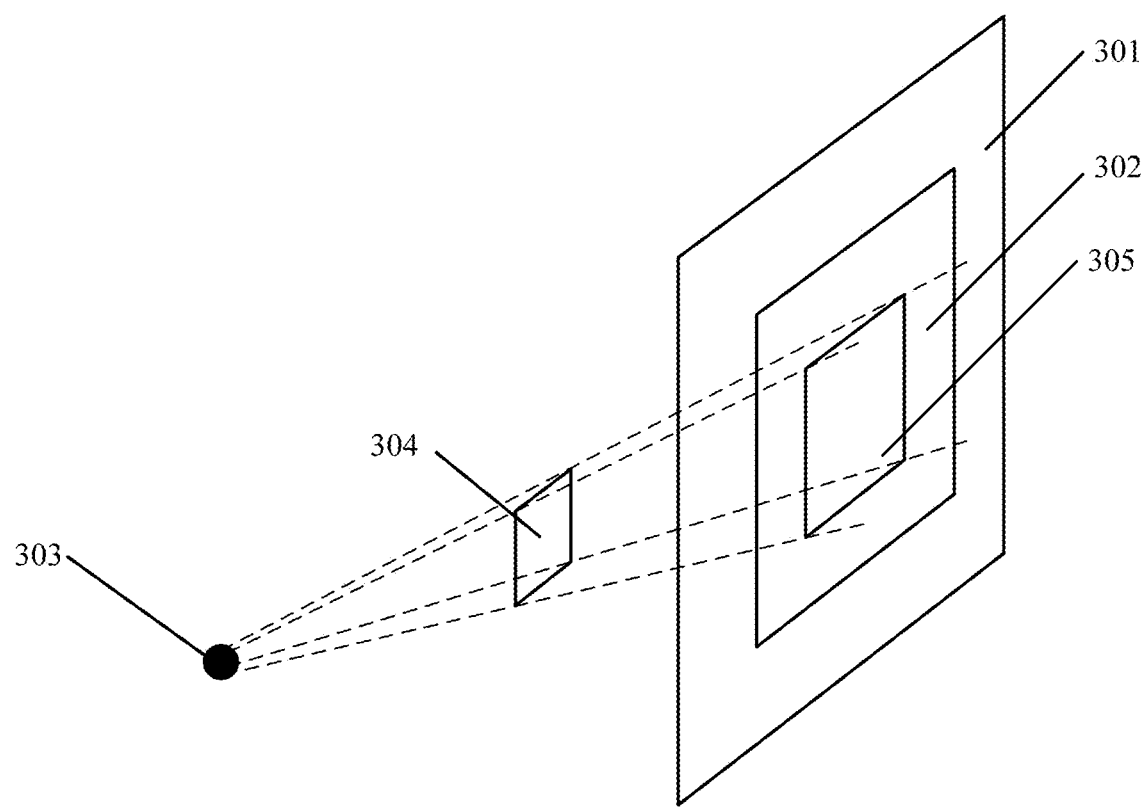
FIG. 3B shows a schematic diagram of an image processing model according to an embodiment.

In an embodiment, as shown in FIG. 3B, the first three-dimensional effect plane image is mapped to a region 302 on a projection plane 301. A first visual area 305 obtained by projection onto the projection plane 301 through a viewpoint 303 and a view window 304 is determined according to a three-dimensional position relationship among the viewpoint 303, the projection plane 301, and the view window 304 and the size of the view window 304. A first image in the first visual area 305 is clipped and displayed.

Figure 3C:
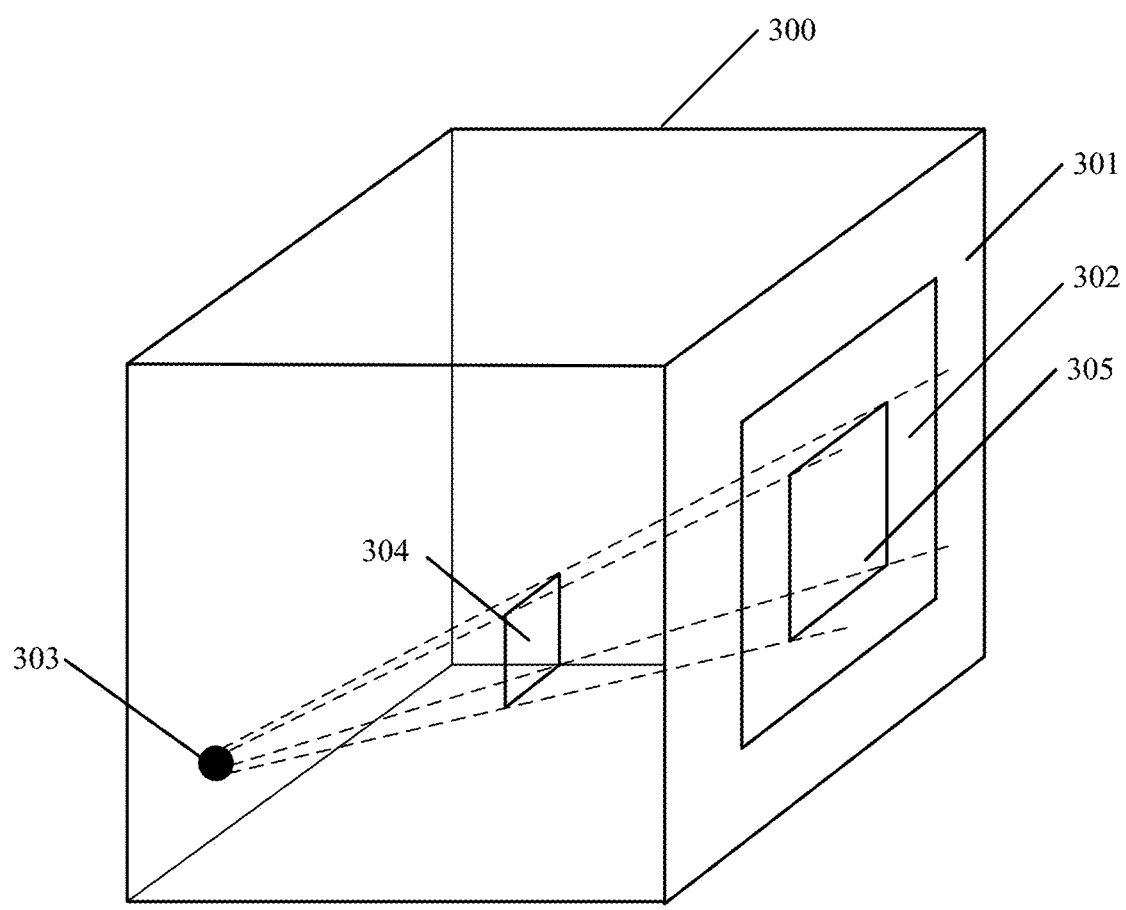
FIG. 3C shows another schematic diagram of the image processing model illustrated in FIG. 3B.

In an embodiment, as shown in FIG. 3C, if the projection plane 301 is a surface of a cube 300, the viewpoint 303 and the view window 304 are located inside the cube 300. The first visual area 305 obtained by projection onto the projection plane 301 of the cube 300 through the viewpoint 303 and the view window 304 is determined according to a three-dimensional position relationship among the viewpoint 303, the cube 300, and the view window 304 and the size of the view window 304. The first image in the first visual area 305 is clipped and displayed.

In an embodiment, after step 102 is performed, as shown in FIG. 1B, the following steps may be further included:

Step 111: Determine, in response to a movement operation performed by the user on the touchscreen, a two-dimensional position offset parameter that corresponds to the movement operation and that is on the touchscreen.

Step 112: Map the two-dimensional position offset parameter to a three-dimensional position offset parameter of the projection plane, and change three-dimensional positions of the projection plane and the first three-dimensional effect plane image according to the three-dimensional position offset parameter.

Step 113: Determine, according to a spatial position relationship among the viewpoint, the projection plane, and the view window and the size of the view window, a second visual area obtained by projection onto the projection plane through the viewpoint and the view window.

Step 114: Clip a second image in the second visual area, and display the second image.

Figure 7C:
FIG. 7C shows a third image depicting the three-dimensional display scene illustrated in FIG. 7A.

In a specific application, a first three-dimensional effect plane image exemplified in the application is shown in FIG. 7A. When the user opens the application on the electronic device, a first image is displayed on the electronic device as shown in FIG. 7B. Then, when the user performs a leftward sliding operation on the touchscreen of the electronic device, it is equivalent to that of a cube including the projection plane being rotated leftward. According to the foregoing method, a second image shown in FIG. 7C and obtained after the first three-dimensional effect plane image is rotated is clipped and displayed.

In an embodiment, the position offset parameter may include coordinates of a first position and coordinates of a second position of the movement operation on the touchscreen.

In an embodiment, first the two-dimensional position offset parameter is mapped to coordinates in a three-dimensional spherical coordinate system. An origin point of the three-dimensional spherical coordinate system may be a center point of a stereoscopic graphic, and the stereoscopic graphic uses the projection plane as a surface of the stereoscopic graphic. The radius of the three-dimensional spherical coordinate system may be a preset value. Then, the three-dimensional spherical coordinates are converted into three-dimensional Cartesian coordinates. An origin point of the three-dimensional Cartesian coordinate system may be the same as the origin point of the three-dimensional spherical coordinate system.

In an embodiment, a process of mapping the two-dimensional position offset parameter to the coordinates of the projection plane in the three-dimensional spherical coordinate system may include the following steps: A two-dimensional plane coordinate X1 and coordinate Y1 of the first position are obtained, and a two-dimensional plane coordinate X2 and coordinate Y2 of the second position are obtained with movement of a finger of the user on the touchscreen. The coordinate X1 and the coordinate Y1 of the first position are converted into three-dimensional spherical coordinates θ1 and φ1. If the first position is a start point of the movement operation, both the three-dimensional spherical coordinates θ1 and φ1 of the first position are set as preset values. For example, θ1=90 and φ1=0. In this way, the two-dimensional plane coordinates are mapped to the coordinates in the three-dimensional spherical coordinate system. Then, the coordinates in the three-dimensional spherical coordinate system are converted into coordinates in the three-dimensional Cartesian coordinate system. The obtained two-dimensional plane coordinate X2 and coordinate Y2 of the second position are converted into three-dimensional spherical coordinates θ2 and φ2, which, for example, may be preset parameters. In this way, the two-dimensional plane coordinates are mapped to the coordinates in the three-dimensional spherical coordinate system. Then, the coordinates in the three-dimensional spherical coordinate system are converted into coordinates in the three-dimensional Cartesian coordinate system.

Figure 4A:
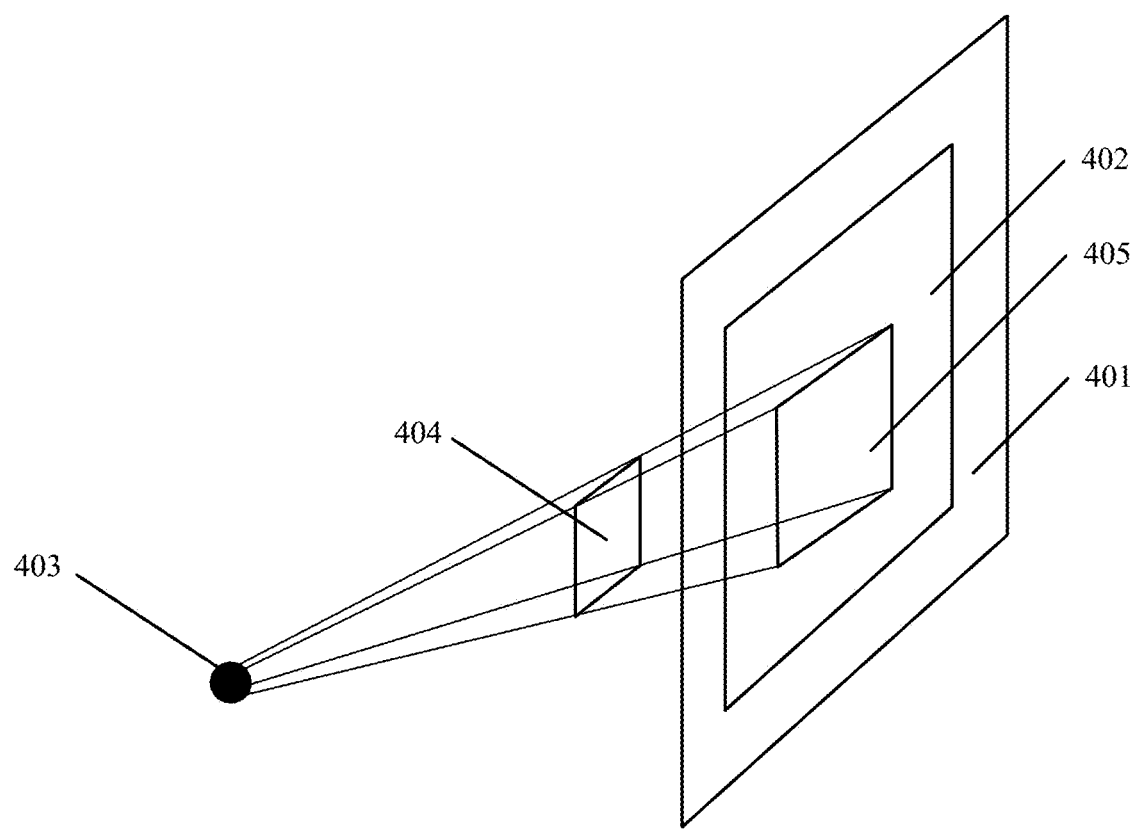
FIG. 4A shows a schematic diagram of an image processing model according to an embodiment.

In an embodiment, the three-dimensional positions of the projection plane and the first three-dimensional effect plane image are converted into the three-dimensional Cartesian coordinate system according to their corresponding coordinates. In an embodiment, as shown in FIG. 4A, when the user performs rightward sliding on the touchscreen, three-dimensional positions of a projection plane 401 and a first three-dimensional effect plane image 402 are changed according to the three-dimensional position offset parameter. A second visual area 405 obtained by projection onto the projection plane 401 through a viewpoint 403 and a view window 404 is determined according to a spatial position relationship among the viewpoint 403, the projection plane 401, and the view window 404 and the size of the view window 404. A second image in the second visual area 405 is clipped and displayed.

Figure 4B:
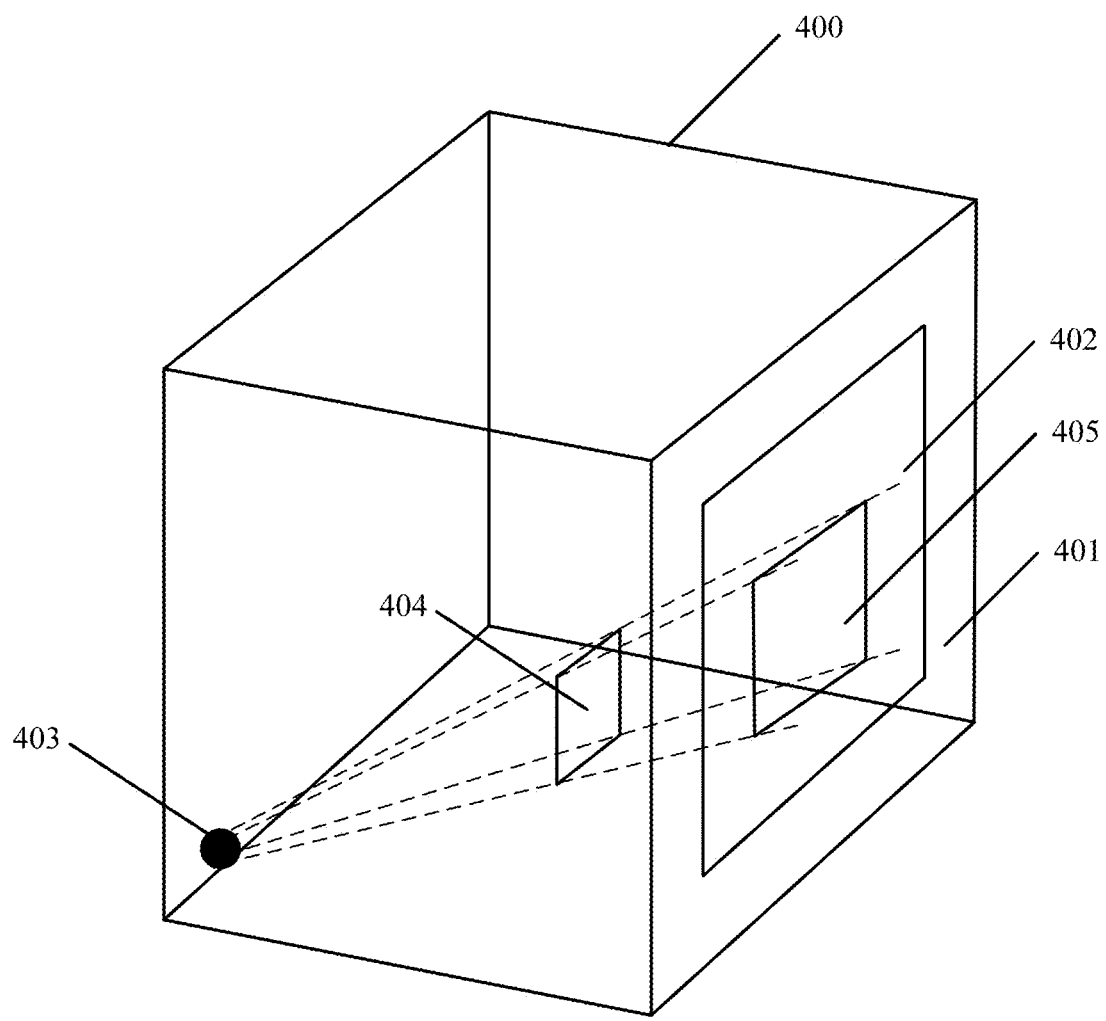
FIG. 4B shows another schematic diagram of the image processing model illustrated in FIG. 4A.

In an embodiment, as shown in FIG. 4B, if the projection plane 401 is a surface of a cube 400, the viewpoint 403 and the view window 404 are located inside the cube 400. When the user performs rightward sliding on the touchscreen, it is equivalent to that the cube 400 is rotated rightward. Specifically, three-dimensional positions of the cube 400 and the first three-dimensional effect plane image 402 are changed according to the three-dimensional position offset parameter. The second visual area 405 obtained by projection onto the projection plane 401 through the viewpoint 403 and the view window 404 is determined according to a spatial position relationship among the viewpoint 403, the cube 400, and the view window 404 and the size of the view window 404. The second image in the second visual area 405 is clipped and displayed.

In an embodiment, after step 102 is performed, as shown in FIG. 1C, the following steps may be further included:

Step 121: Obtain a three-dimensional position parameter of a second three-dimensional effect plane image in the three-dimensional Cartesian coordinate system.

Figure 7D:
FIG. 7D shows a fourth image depicting the three-dimensional display scene illustrated in FIG. 7A.

In an application example of the present disclosure, as shown in FIG. 7D, the second three-dimensional effect plane image is a three-dimensional effect plane image for newly added objects (such as a desk lamp or a computer on a desk, a doll on a display stand, and a picture on the wall).

In an embodiment, the three-dimensional position parameter of the second three-dimensional effect image may be preset. Alternatively, in response to a movement operation (for example, a dragging operation) performed by the user on the second three-dimensional effect plane image on the touchscreen, a two-dimensional plane position parameter of a termination position of the moved second three-dimensional effect plane image may be determined, and the two-dimensional plane position parameter of the termination position is mapped to a three-dimensional position parameter.

Step 122: Determine a three-dimensional position of the second three-dimensional effect plane image according to the obtained three-dimensional position parameter.

Step 123: Project the second three-dimensional effect plane image onto the projection plane according to a three-dimensional position relationship among the viewpoint, the projection plane, and the second three-dimensional effect plane image.

Step 124: Clip a third image in the first visual area, and display the third image.

In a specific application, a first three-dimensional effect plane image exemplified in the application is shown in FIG. 7A. According to the foregoing method, the user places a plurality of objects (such as the desk lamp or the computer on the desk, the doll on the display standard, and the picture on the wall shown in FIG. 7D) at corresponding positions on the screen by using the dragging operation performed on the touchscreen. In response to the dragging operation of the user, according to the foregoing method, a position of a second three-dimensional effect plane image corresponding to the plurality of objects is obtained, the second three-dimensional effect plane image is projected onto the projection plane, and a third image including the foregoing objects shown in FIG. 7D is clipped and displayed.

Figure 5A:
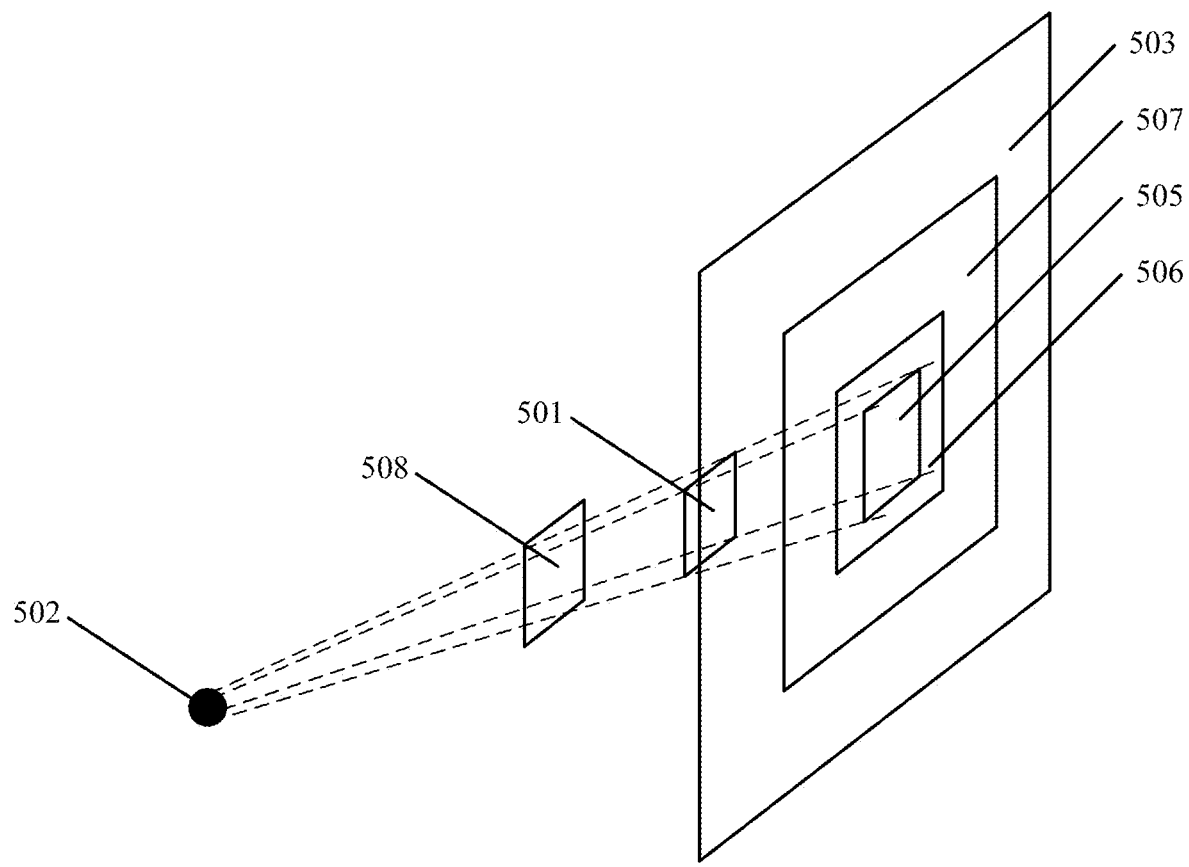
FIG. 5A shows a schematic diagram of an image processing model according to an embodiment.

In an embodiment, as shown in FIG. 5A, a three-dimensional position of a second three-dimensional effect plane image 501 is determined according to an obtained three-dimensional position parameter. The second three-dimensional effect plane image 501 is projected into a region 505 on a projection plane 503 according to a three-dimensional position relationship among a viewpoint 502, the projection plane 503, and the second three-dimensional effect plane image 501. A third image in a first visual area 506 is clipped and displayed. The first three-dimensional effect plane image is mapped to a region 507 on the projection plane 503, the first visual area 506 is determined according to a spatial position relationship among the viewpoint 502, the projection plane 503, and a view window 508 and the size of the view window 508. A mapping region of the second three-dimensional effect plane image 501 on the projection plane may be totally or partially overlapped with the first visual area 506.

Figure 5B:
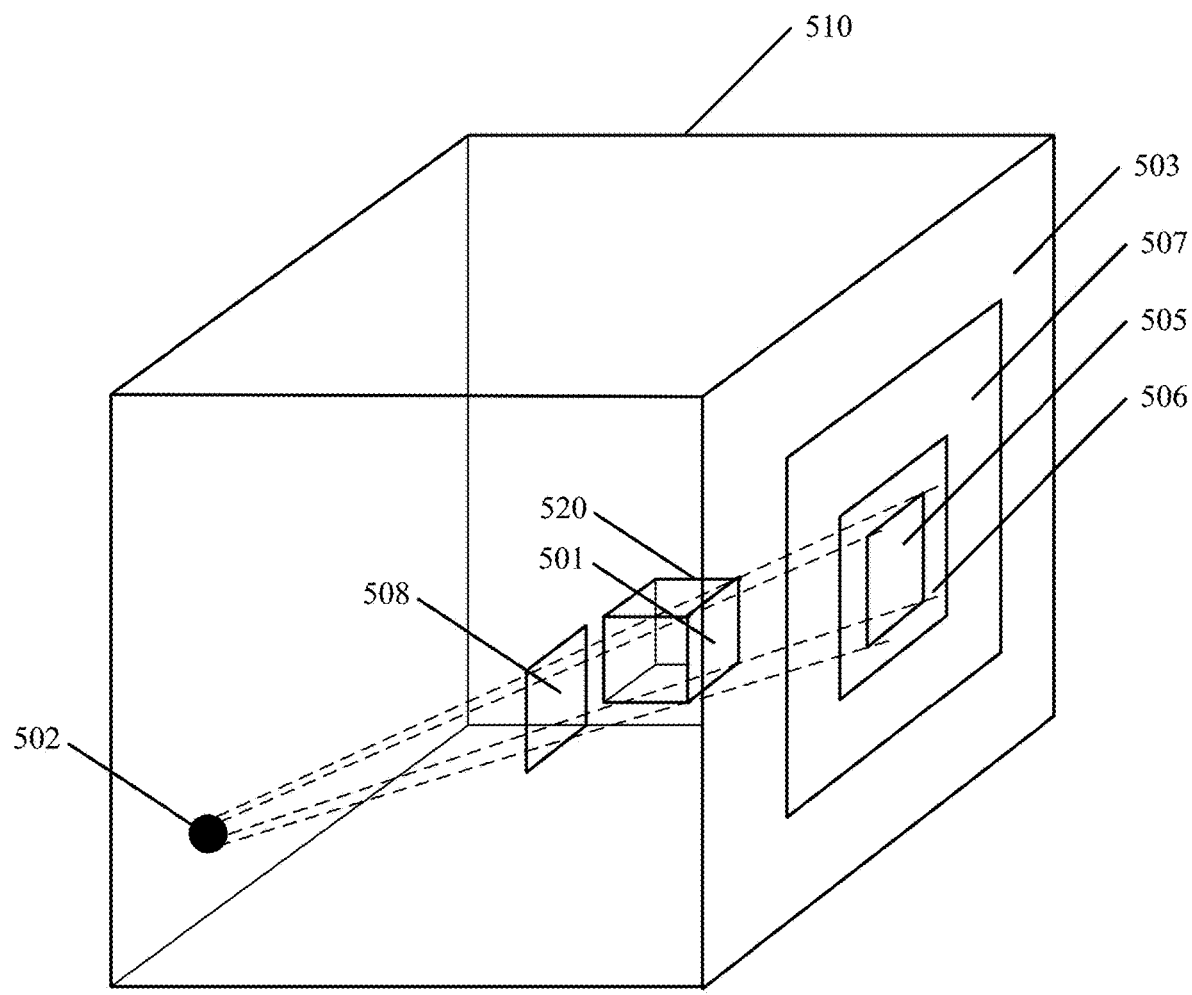
FIG. 5B shows another schematic diagram of the image processing model illustrated in FIG. 5A.

In an embodiment, as shown in FIG. 5B, if the projection plane 503 is a face surface of a cube 510, the viewpoint 502 and the view window 508 are located inside the cube 510. The second three-dimensional effect plane image 501 may be located on a surface of a cube 520. A three-dimensional position of the cube 520 is determined according to the obtained three-dimensional position parameter. The second three-dimensional effect plane image 501 is projected into the region 505 on the projection plane 503 according to a three-dimensional position relationship among the viewpoint 502, the cube 510, and the cube 520. The third image in the first visual area 506 is clipped and displayed. The first three-dimensional effect plane image is mapped to the region 507 on the projection plane 503, the first visual area 506 is determined according to the spatial position relationship among the viewpoint 502, the projection plane 503, and the view window 508 and the size of the view window 508.

According to the method provided in this embodiment of this application, when a new object is added to a scene, only a three-dimensional effect plane image corresponding to the object needs to be added, and extra processing does not need to be performed on an original three-dimensional effect plane image, further reducing the processing complexity of a computer and saving processing resources of the computer.

Figure 1D:
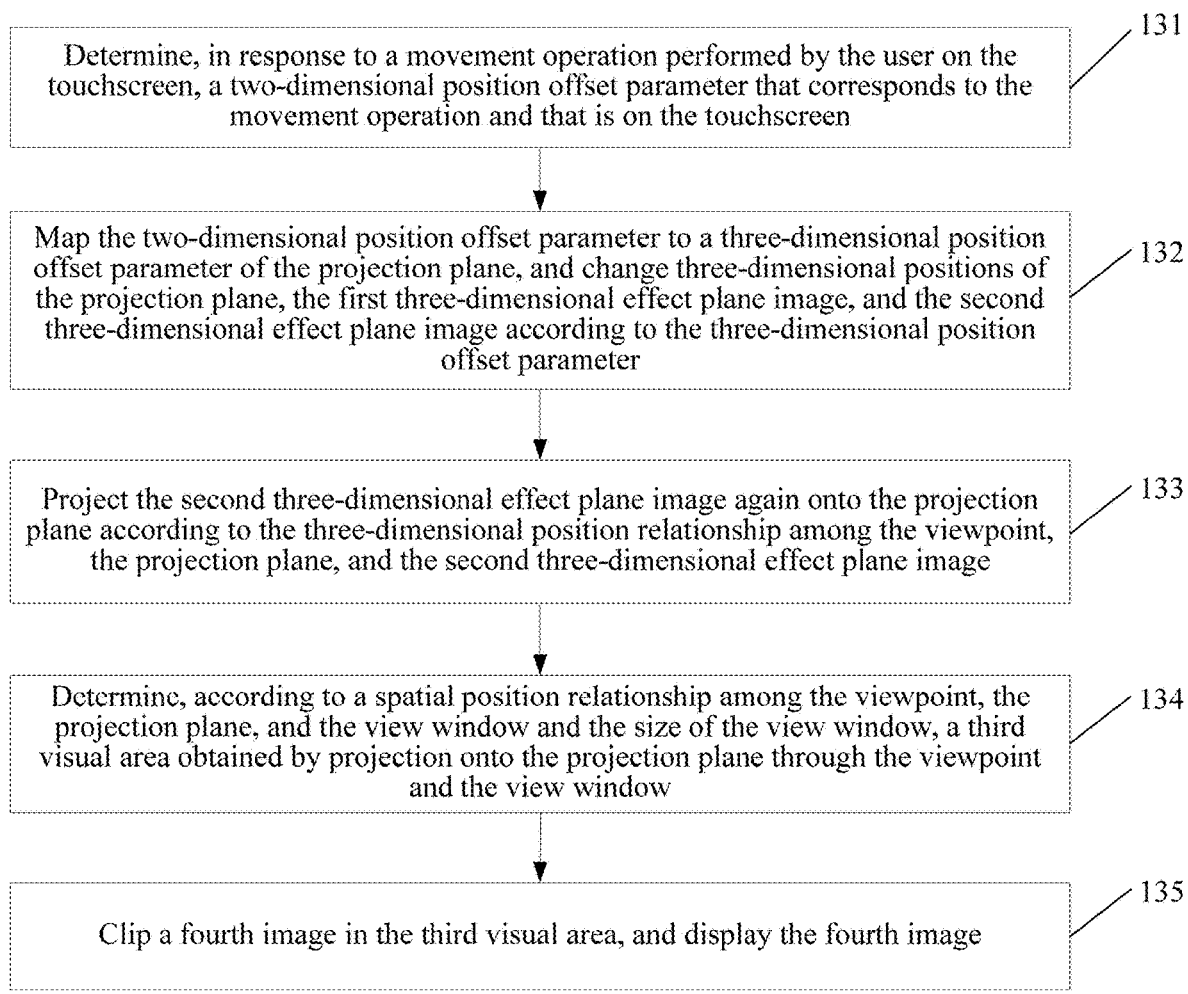
FIG. 1D shows a flowchart of an image processing method according to another embodiment.

In an embodiment, after step 104 is performed, as shown in FIG. 1D, the following steps may be further included:

Step 131: Determine, in response to a movement operation performed by the user on the touchscreen, a two-dimensional position offset parameter that corresponds to the movement operation and that is on the touchscreen.

Step 132: Map the two-dimensional position offset parameter to a three-dimensional position offset parameter of the projection plane, and change three-dimensional positions of the projection plane, the first three-dimensional effect plane image, and the second three-dimensional effect plane image according to the three-dimensional position offset parameter.

Step 133: Project the second three-dimensional effect plane image again onto the projection plane according to the three-dimensional position relationship among the viewpoint, the projection plane, and the second three-dimensional effect plane image.

Step 134: Determine, according to a spatial position relationship among the viewpoint, the projection plane, and the view window and the size of the view window, a third visual area obtained by projection onto the projection plane through the viewpoint and the view window.

Step 135: Clip a fourth image in the third visual area, and display the fourth image.

Figure 7E:
FIG. 7E shows a fifth image depicting the three-dimensional display scene illustrated in FIG. 7A.

In a specific application, a first three-dimensional effect plane image exemplified in the application is shown in FIG. 7A. After a second three-dimensional effect plane image for a plurality of objects is added, when the user performs a leftward sliding operation on the touchscreen of the electronic device, it is equivalent to that of a cube including the projection plane being rotated leftward. According to the foregoing method, a fourth image including the foregoing newly added objects shown in FIG. 7E is clipped and displayed.

Figure 6A:
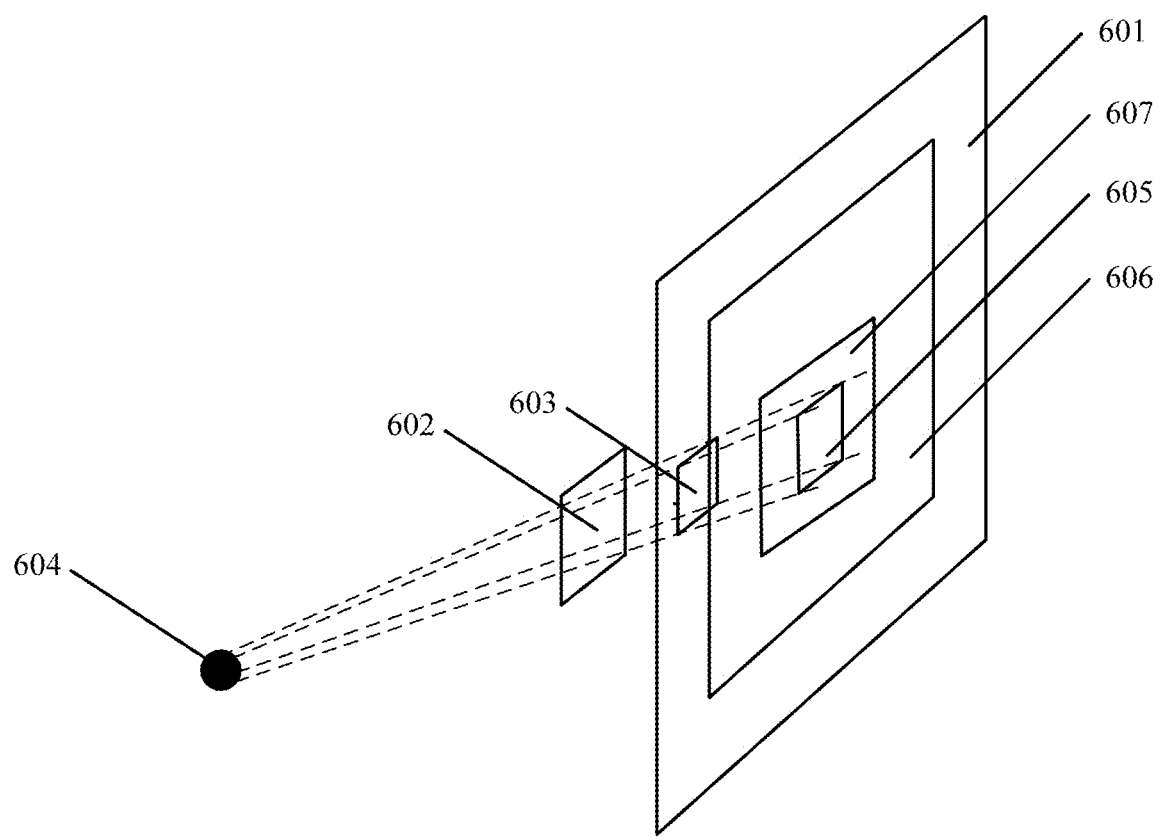
FIG. 6A shows a schematic diagram of an image processing model according to an embodiment.

In an embodiment, as shown in FIG. 6A, when the user performs rightward sliding on the touchscreen, three-dimensional positions of a projection plane 601, a first three-dimensional effect plane image 606, and a second three-dimensional effect plane image 603 are changed according to the three-dimensional position offset parameter. The second three-dimensional effect plane image 603 is projected again into a region 605 on the projection plane 601 according to a three-dimensional position relationship among a viewpoint 604, the projection plane 601, and the second three-dimensional effect plane image 603. A third visual area 607 obtained by projection onto the projection plane 601 through the viewpoint 604 and a view window 602 is determined according to a spatial position relationship among the viewpoint 604, the projection plane 601, and the view window 602 and the size of the view window 602. A fourth image in the third visual area 607 is clipped and displayed.

Figure 6B:
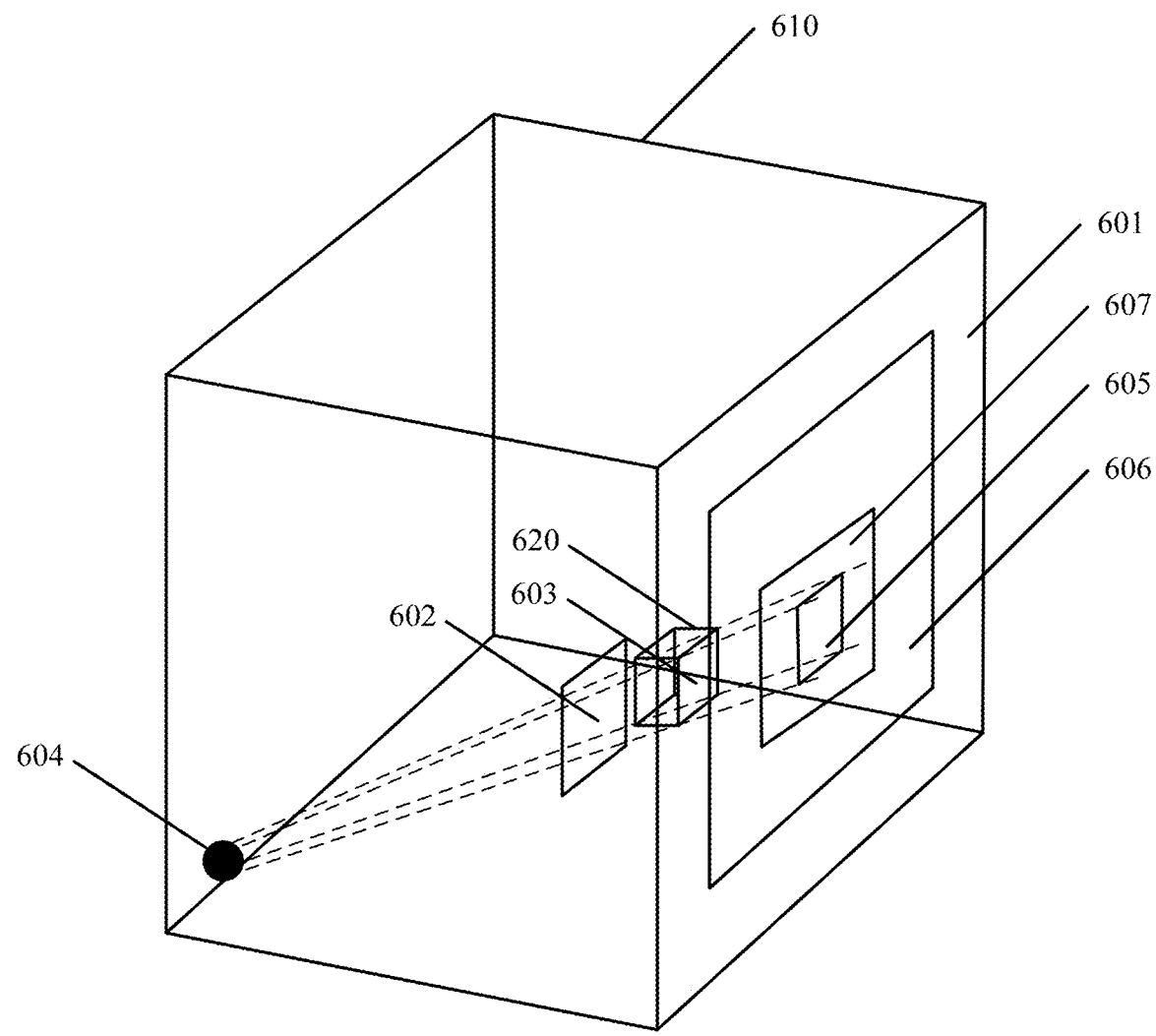
FIG. 6B shows another schematic diagram of the image processing model illustrated in FIG. 6A.

In an embodiment, as shown in FIG. 6B, if the projection plane 601 is a surface of a cube 610, the viewpoint 604 and the view window 602 are located inside the cube 610. The second three-dimensional effect plane image 603 may be located on a surface of a cube 620. When the user performs rightward sliding on the touchscreen, it is equivalent to that the cubes 610 and 620 are rotated rightward synchronously. Three-dimensional positions of the cube 610, the cube 620, the first three-dimensional effect plane image 606, and the second three-dimensional effect plane image 603 are changed according to the three-dimensional position offset parameter. The second three-dimensional effect plane image 603 is projected again into the region 605 on the projection plane 601 according to a three-dimensional position relationship among the viewpoint 604, the cube 610, and the cube 620. A third visual area 607 obtained by projection onto the projection plane 601 through the viewpoint 604 and the view window 602 is determined according to a spatial position relationship among the viewpoint 604, the cube 610, and the view window 602 and the size of the view window 602. The fourth image in the third visual area 607 is clipped and displayed.

The image processing method provided in the embodiments is described above. The following describes an image processing device provided in the embodiments with reference to the accompanying drawings.

Figure 8:
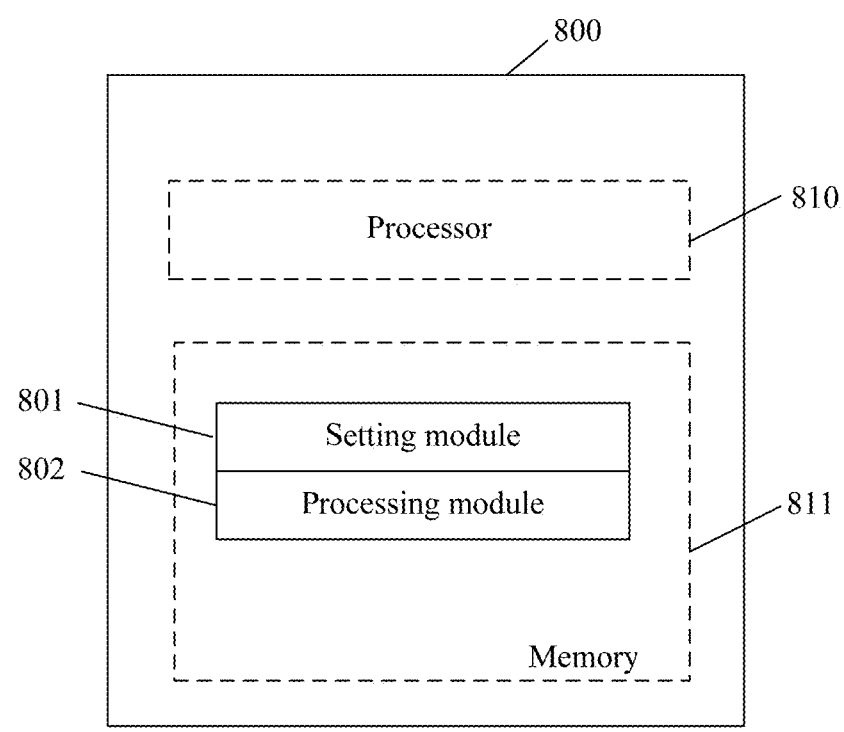
FIG. 8 shows a schematic structural diagram of an image processing device according to an embodiment.

FIG. 8 is a schematic structural diagram of an image processing device according to an embodiment. The device may be an electronic device including a touchscreen. The device 800 includes the following modules: a setting module 801, configured to preset an image processing model, the model including a viewpoint, a projection plane, a view window, and a three-dimensional position relationship among the viewpoint, the projection plane, and the view window; and a processing module 802, configured to perform the following processing based on the model when a first three-dimensional effect plane image is displayed in response to an operation of a user: mapping the first three-dimensional effect plane image to the projection plane; determining, according to the three-dimensional position relationship among the viewpoint, the projection plane, and the view window and the size of the view window, a first visual area obtained by projection onto the projection plane through the viewpoint and the view window; and clipping a first image in the first visual area, and displaying the first image.

In an embodiment, after the first image is displayed, the processing module 802 is further configured to: determine, in response to a movement operation performed by the user on the touchscreen, a two-dimensional position offset parameter that corresponds to the movement operation and that is on the touchscreen; map the two-dimensional position offset parameter to a three-dimensional position offset parameter of the projection plane, and change three-dimensional positions of the projection plane and the first three-dimensional effect plane image according to the three-dimensional position offset parameter; determine, according to a spatial position relationship among the viewpoint, the projection plane, and the view window and the size of the view window, a second visual area obtained by projection onto the projection plane through the viewpoint and the view window; and clip a second image in the second visual area, and display the second image.

In an embodiment, the processing module 802 is configured to map two-dimensional plane coordinates of the position offset parameter to coordinates in a three-dimensional Cartesian coordinate system, an origin point of the three-dimensional Cartesian coordinate system being a center point of a stereoscopic graphic, and the stereoscopic graphic using the projection plane as a surface of the stereoscopic graphic.

In an embodiment, after the first image is displayed, the processing module 802 is further configured to: obtain a three-dimensional position parameter of a second three-dimensional effect plane image in the three-dimensional Cartesian coordinate system; determine a three-dimensional position of the second three-dimensional effect plane image according to the obtained three-dimensional position parameter; project the second three-dimensional effect plane image onto the projection plane according to a three-dimensional position relationship among the viewpoint, the projection plane, and the second three-dimensional effect plane image; and clip a third image in the first visual area, and display the third image.

In an embodiment, the processing module 802 is configured to: obtain a preset three-dimensional position parameter of the second three-dimensional effect plane image; or determine, in response to a movement operation performed by the user on the second three-dimensional effect plane image on the touchscreen, a two-dimensional plane position parameter of a termination position of the moved second three-dimensional effect plane image, and map the two-dimensional plane position parameter of the termination position to a three-dimensional position parameter.

In an embodiment, after the third image is displayed, the processing module 802 is further configured to: determine, in response to a movement operation performed by the user on the touchscreen, a two-dimensional position offset parameter that corresponds to the movement operation and that is on the touchscreen; map the two-dimensional position offset parameter to a three-dimensional position offset parameter of the projection plane, and change three-dimensional positions of the projection plane, the first three-dimensional effect plane image, and the second three-dimensional effect plane image according to the three-dimensional position offset parameter; project the second three-dimensional effect plane image again onto the projection plane according to the three-dimensional position relationship among the viewpoint, the projection plane, and the second three-dimensional effect plane image; determine, according to a spatial position relationship among the viewpoint, the projection plane, and the view window and the size of the view window, a third visual area obtained by projection onto the projection plane through the viewpoint and the view window; and clip a fourth image in the third visual area, and display the fourth image.

The setting module 801 and the processing module 802 may be instruction modules stored in a memory 811 of the device 800. The instruction modules include instructions that can be executed by a processor. When a processor 810 of the device 800 executes the instructions in the modules 801 and 802, various functions of the setting module 801 and the processing module 802 can be implemented.

In addition, function modules in the embodiments may be integrated into one processing unit, or each of the modules may exist alone physically, or two or more modules may be integrated into one unit. The integrated unit may be implemented in a form of hardware, or may be implemented in a form of a software function unit. The function modules in the embodiments may be located on one terminal or network node, or may be distributed on multiple terminals or network nodes.

In addition, each embodiment of the present disclosure may be implemented by a data processing program executed by a data processing device such as a computer. Apparently, the data processing program constitutes the present disclosure. In addition, generally, a data processing program stored in a storage medium is directly read from the storage medium for execution or the program is installed on or replicated to a storage device (such as a hard disk or memory) of a data processing device for execution. Therefore, such a storage medium also constitutes the present disclosure. The storage medium may use any type of recording manner, such as a paper storage medium (such as a paper tape), a magnetic storage medium (such as a floppy disk, a hard disk, or a flash memory), an optical storage medium (such as a CD-ROM), or a magneto-optical storage medium (such as an MO).

Therefore, the present disclosure further provides a storage medium, which stores a data processing program. The data processing program is used for executing any embodiment of the foregoing method of the present disclosure.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments, but are not intended to limit the present disclosure. Any modification, equivalent replacement, or improvement made within the spirit and principle of the present disclosure shall fall within the protection scope of the present disclosure.

What is claimed is:

1. An image processing method, applied to an electronic device comprising a touchscreen, the method comprising:
arranging an image processing model, the image processing model comprising a viewpoint, a projection plane, a view window, and a three-dimensional position relationships amongst the viewpoint, the projection plane, and the view window; and
when a first three-dimensional effect plane image is displayed in response to an operation of a user received by the electronic device:
mapping the first three-dimensional effect plane image to the projection plane;
determining, according to the three-dimensional position relationships and a size of the view window, a first visual area obtained by projection onto the projection plane through the viewpoint and the view window;
clipping a first image in the first visual area;
displaying the first image;
determining, in response to a movement input received on the touchscreen, a two-dimensional position offset parameter corresponding to the movement input;
mapping two-dimensional plane coordinates of the two-dimensional position offset parameter to a three-dimensional position offset parameter of the projection plane, the three-dimensional position offset parameter comprising coordinates in a three-dimensional Cartesian coordinate system, wherein an origin point of the three-dimensional coordinate system is a center point of a stereoscopic graphic, and wherein the projection plane is included as a surface of the stereoscopic graphic, and changing three-dimensional positions of the projection plane and the first three-dimensional effect plane image according to the three-dimensional offset parameter;
determining, according to a spatial position relationship amongst the viewpoint, the projection plane, and the view window and the size of the view window, a second visual area obtained by projection onto the projection plane through the viewpoint and the view window;
clipping a second image in the second visual area; and
displaying the second image.

2. The method according to claim 1, after the displaying the first image, further comprising:
obtaining a three-dimensional position parameter of a second three-dimensional effect plane image in the three-dimensional Cartesian coordinate system;
determining a three-dimensional position of the second three-dimensional effect plane image according to the obtained three-dimensional position parameter;
projecting the second three-dimensional effect plane image onto the projection plane according to a three-dimensional position relationship amongst the viewpoint, the projection plane, and the second three-dimensional effect plane image;
clipping a third image in the first visual area; and
displaying the third image.

3. The method according to claim 2, wherein the movement input comprises a first movement input, wherein obtaining the three-dimensional position parameter of the second three-dimensional effect plane image comprises:
obtaining a preset three-dimensional position parameter of the second three-dimensional effect plane image; or
determining, in response to a second movement input received on the second three-dimensional effect plane image displayed on the touchscreen, a two-dimensional plane position parameter of a termination position of the second three-dimensional effect plane image, and mapping the two-dimensional plane position parameter of the termination position to the three-dimensional position parameter.

4. The method according to claim 2, wherein the movement input comprises a first movement input, wherein the two-dimensional position offset parameter comprises a first two-dimensional offset parameter, the three-dimensional position offset parameter comprises a first three-dimensional offset parameter, and wherein after displaying the third image, further comprising:
determining, in response to a second movement input received on the touchscreen, a second two-dimensional position offset parameter that corresponds to the second movement input;
mapping the second two-dimensional position offset parameter to a second three-dimensional position offset parameter of the projection plane, and the changing three-dimensional positions of the projection plane, the first three-dimensional effect plane image, and the second three-dimensional effect plane image according to the second three-dimensional position offset parameter;
projecting the second three-dimensional effect plane image onto the projection plane according to the three-dimensional position relationship amongst the viewpoint, the projection plane, and the second three-dimensional effect plane image;
determining, according to a spatial position relationship amongst the viewpoint, the projection plane, and the view window and the size of the view window, a third visual area obtained by projection onto the projection plane through the viewpoint and the view window;
clipping a fourth image in the third visual area; and
displaying the fourth image.

5. An image processing device, comprising a touchscreen, the device further comprising:
a memory configured to store processor-executable instructions; and
a processor configured to communicate with the memory and execute the processor-executable instructions to:
arrange an image processing model, the model comprising a viewpoint, a projection plane, a view window, and a three-dimensional position relationship amongst the viewpoint, the projection plane, and the view window; and when a first three-dimensional effect plane image is displayed in response to an operation of a user received by the image processing device:
  map the first three-dimensional effect plane image to the projection plane;
  determine, according to the three-dimensional position relationships and a size of the view window, a first visual area obtained by projection onto the projection plane through the viewpoint and the view window;
  clip a first image in the first visual area;
  display the first image
  determine, in response to a movement input received on the touchscreen, a two-dimensional position offset parameter corresponding to the movement input;
  map two-dimensional plane coordinates of the two-dimensional position offset parameter to a three-dimensional position offset parameter of the projection plane, the three-dimensional position offset parameter comprising coordinates in a three-dimensional Cartesian coordinate system, wherein an origin point of the three-dimensional coordinate system is a center point of a stereoscopic graphic, and wherein the projection plane is included as a surface of the stereoscopic graphic, and change three-dimensional positions of the projection plane and the first three-dimensional effect plane image according to the three-dimensional offset parameter;
  determine, according to a spatial position relationship amongst the viewpoint, the projection plane, and the view window and the size of the view window, a second visual area obtained by projection onto the projection plane through the viewpoint and the view window;
  clip a second image in the second visual area; and
  display the second image.

6. The device according to claim 5, wherein after the first image is displayed, the processor is further configured to execute the processor-executable instructions to:
  obtain a three-dimensional position parameter of a second three-dimensional effect plane image in the three-dimensional Cartesian coordinate system;
  determine a three-dimensional position of the second three-dimensional effect plane image according to the obtained three-dimensional position parameter;
  project the second three-dimensional effect plane image onto the projection plane according to a three-dimensional position relationship amongst the viewpoint, the projection plane, and the second three-dimensional effect plane image;
  clip a third image in the first visual area; and
  display the third image.

7. The device according to claim 6, wherein the movement input comprises a first movement input, wherein the processor is configured to execute the processor-executable instructions to obtain the three-dimensional position parameter of the second three-dimensional effect plane image by:
  obtaining a preset three-dimensional position parameter of the second three-dimensional effect plane image; or
  determining, in response to a second movement input received on the second three-dimensional effect plane image displayed on the touchscreen, a two-dimensional plane position parameter of a termination position of the second three-dimensional effect plane image, and mapping the two-dimensional plane position parameter of the termination position to the three-dimensional position parameter.

8. The device according to claim 7, wherein the movement input comprises a first movement input, wherein the two-dimensional position offset parameter comprises a first two-dimensional offset parameter, the three-dimensional position offset parameter comprises a first three-dimensional offset parameter, and wherein after the third image is displayed, the processor is further configured to execute the processor-executable instructions to:
  determine, in response to a second movement input received on the touchscreen, a two-dimensional position offset parameter that corresponds to the movement input;
  map the two-dimensional position offset parameter to a second three-dimensional position offset parameter of the projection plane, and changing three-dimensional positions of the projection plane, the first three-dimensional effect plane image, and the second three-dimensional effect plane image according to the second three-dimensional position offset parameter;
  project the second three-dimensional effect plane image onto the projection plane according to the three-dimensional position relationship among the viewpoint, the projection plane, and the second three-dimensional effect plane image;
  determine, according to a spatial position relationship amongst the viewpoint, the projection plane, and the view window and the size of the view window, a third visual area obtained by projection onto the projection plane through the viewpoint and the view window;
  clip a fourth image in the third visual area; and
  display the fourth image.

* * * * *